US007657365B2

(12) United States Patent
Fukushima et al.

(10) Patent No.: US 7,657,365 B2
(45) Date of Patent: Feb. 2, 2010

(54) FUEL INJECTION QUANTITY CONTROL SYSTEM FOR GENERAL-PURPOSE ENGINE

(75) Inventors: Tomoki Fukushima, Wako (JP); Hayato Matsuda, Wako (JP); Takashi Hashizume, Wako (JP); Shigeru Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/258,124

(22) Filed: Oct. 24, 2008

(65) Prior Publication Data

US 2009/0118976 A1 May 7, 2009

(30) Foreign Application Priority Data

Oct. 30, 2007 (JP) ............................ 2007-282188

(51) Int. Cl.
*G06F 19/00* (2006.01)
*F02M 51/00* (2006.01)

(52) U.S. Cl. ....................... 701/110; 701/104; 123/491; 123/478

(58) Field of Classification Search ................. 701/103, 701/104, 105, 110; 123/491, 492, 493, 478, 123/480
See application file for complete search history.

(56) References Cited

U.S. PATENT DOCUMENTS

| | | | | |
|---|---|---|---|---|
| 4,240,383 | A | | 12/1980 | Horbelt et al. |
| 4,463,730 | A | | 8/1984 | Kishi |
| 4,466,412 | A | | 8/1984 | McChesney et al. |
| 4,947,818 | A | * | 8/1990 | Kamohara et al. ............ 60/276 |
| 4,953,513 | A | * | 9/1990 | Sasaki et al. ................ 123/675 |
| 5,014,672 | A | | 5/1991 | Fujii et al. |
| 5,054,451 | A | * | 10/1991 | Kushi ......................... 123/478 |
| 6,073,611 | A | * | 6/2000 | Ohuchi et al. ............... 123/435 |
| 6,092,515 | A | * | 7/2000 | Morikawa ................... 123/698 |
| 7,140,356 | B2 | * | 11/2006 | Kishibata et al. ............ 123/492 |
| 2003/0062028 | A1 | * | 4/2003 | Kitagawa et al. ............ 123/486 |
| 2007/0079596 | A1 | * | 4/2007 | Asano ......................... 60/274 |
| 2008/0060427 | A1 | * | 3/2008 | Hoshi et al. ................ 73/117.3 |

FOREIGN PATENT DOCUMENTS

JP 8-135491 A 5/1996

* cited by examiner

*Primary Examiner*—John T Kwon
(74) *Attorney, Agent, or Firm*—Arent Fox LLP

(57) ABSTRACT

A fuel injection control system corrects the amount of fuel injected by fuel injection valves toward an increased side when an acceleration state resulting from operation of a throttle occurs. A control unit includes a detector, an acceleration state determinor, and an acceleration corrector. When an increase in the detected value is a predetermined value or more within a first predetermined time period, the acceleration state determiner determines that a state is an acceleration state and inputs a signal inducing fuel-amount-increase correction to the acceleration corrector. When the state where an amount of change in the detected value reaches a predetermined value or more in an increasing or decreasing direction within a first predetermined time period continuously occurs a predetermined number of times or more before a second predetermined time period expires, determination of the acceleration state is stopped until a third predetermined time period passes.

10 Claims, 11 Drawing Sheets

FUEL INJECTION QUANTITY CONTROL SYSTEM FOR GENERAL-PURPOSE ENGINE

BACKGROUND OF THE INVENTION

1. Field of the Invention

The present invention relates to a fuel injection quantity control system for a general-purpose engine having a control unit which corrects an amount of fuel injected by a fuel injection valve into an intake passage toward an increased side when an acceleration state results from operation of a throttle operator.

2. Description of the Related Art

A motorcycle engine in which a quantity of fuel injected at the time of vehicle acceleration is controlled by increase-quantity correction is disclosed by Japanese Patent Application Laid-open No. 8-135491.

Assume that the technique disclosed in Japanese Patent Application Laid-open No. 8-135491 is applied, without any modifications, to a general-purpose engine in which the opening degree of a throttle valve is set in accordance with manual operation of throttle operating means. In a case where the throttle operating means is manually operated to successively open and close the throttle valve, it is determined that the engine is in an acceleration state when an increase in the opening of the throttle valve per unit time is a predetermined value or more. Consequently, although correction of the amount of fuel injected toward an increased side is successively performed, there is a drawback of an undesired after-burn occurring occasionally.

SUMMARY OF THE INVENTION

The present invention has been attained in view of the above-described drawback. An aspect of the present invention is to provide a fuel injection quantity control system for a general-purpose engine that is capable of avoiding after-burn from occurring by preventing unnecessary correction of the fuel injection amount toward an increased side when opening/closing operations are successively performed by the throttle operator.

According to a first feature of the present invention, a fuel injection quantity control system is provided for a general-purpose engine, the control system including a control unit controlling an amount of fuel injected by a fuel injection valve into an intake passage, in accordance with an operation of a throttle operator which sets an opening degree of a throttle valve by manual operation. The control unit corrects or adjusts the amount of fuel injected by the fuel injection valve toward an increased side when an acceleration state resulting from operation of the throttle operator occurs. The control unit includes a detector which detects an index representing the opening degree of the throttle valve; an acceleration state determinor which determines the acceleration state based on a change in a value detected by the detector; and an acceleration corrector which corrects the amount of fuel injected by the fuel injection valve toward the increased side when the acceleration state determiner determines that the acceleration state is present. When an increase in value detected by the detector is a predetermined value or more within a first predetermined time period, the acceleration state determiner determines that the acceleration state is present, and then inputs a signal inducing a fuel-amount-increase correction to the acceleration corrector. When the state where an amount of change in the value detected by the detector continuously reaches a predetermined value or more in either of increasing or decreasing direction within a first predetermined time period a predetermined number of times or more before a second predetermined time period expires on each state, the determination of the acceleration state is stopped until a third predetermined time period passes.

With the first feature, when the state where an amount of change in the value detected by the detector continuously reaches a predetermined value or more in either of increasing or decreasing direction within a first predetermined time period a predetermined number of times or more before a second predetermined time period expires on each state, the determination of the acceleration state is stopped until a third predetermined time period passes. Accordingly, it is possible to prevent the unnecessary correction of the amount of fuel injected by the fuel injection valves toward an increased side from being performed when the throttle valves successively open and close in accordance with successive opening/closing operations of the throttle operator, thereby preventing any after-burn from occurring.

Further, according to a second feature of the present invention, when the state where an amount of change in the value detected by the detector reaches a predetermined value or more in either of increasing or decreasing direction within a first predetermined time period a predetermined number of times or more within a fourth predetermined time period, the determination of the acceleration state is stopped until a fifth predetermined time period passes.

Moreover, with the second feature, when the state where an amount of change in the value detected by the detector for detecting an index representing the opening degrees of the throttle valves reaches a predetermined value or more in either of increasing or decreasing direction within a first predetermined time period a predetermined number of times or more within a fourth predetermined time period, the determination of the acceleration state is stopped until a fifth predetermined time period passes. Accordingly, it is possible to prevent the unnecessary correction of the amount of fuel injected by the fuel injection valves toward an increased side when the throttle valves successively open and close in accordance with successive opening/closing operations of the throttle operator, thereby preventing any after-burn from occurring.

It should be noted that a knob in the embodiments described below corresponds to the throttle operating means of the present invention, and that target revolution number computing means corresponds to the detection means of the present invention.

The present invention will be described below on the basis of embodiments illustrated in the accompanying drawings.

DESCRIPTION OF THE PREFERRED EMBODIMENTS

Figure 1:
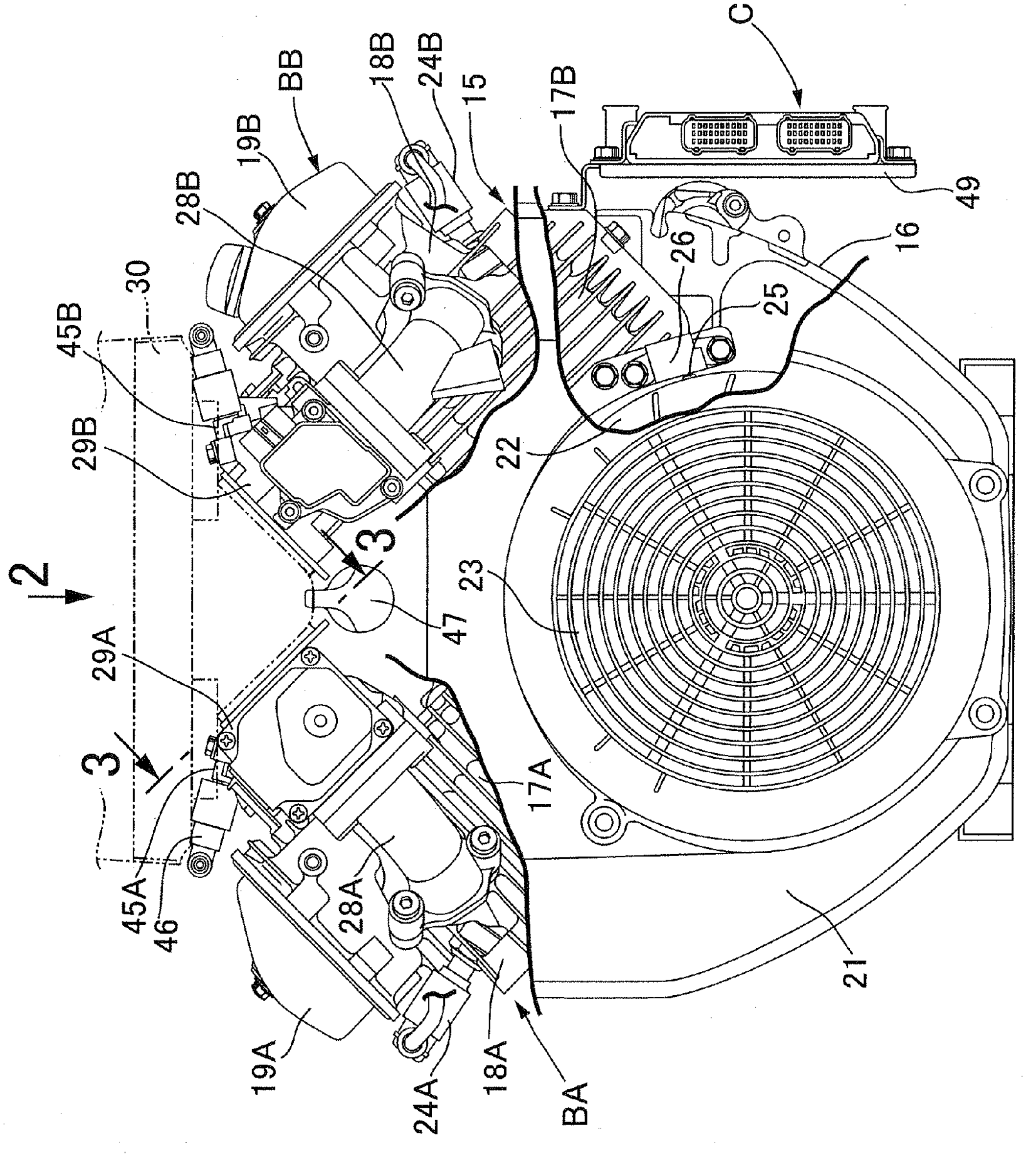
FIG. 1 is a partial cross-sectional front view of a general-purpose engine having a fuel injection control system according to the present invention.
Figure 2:
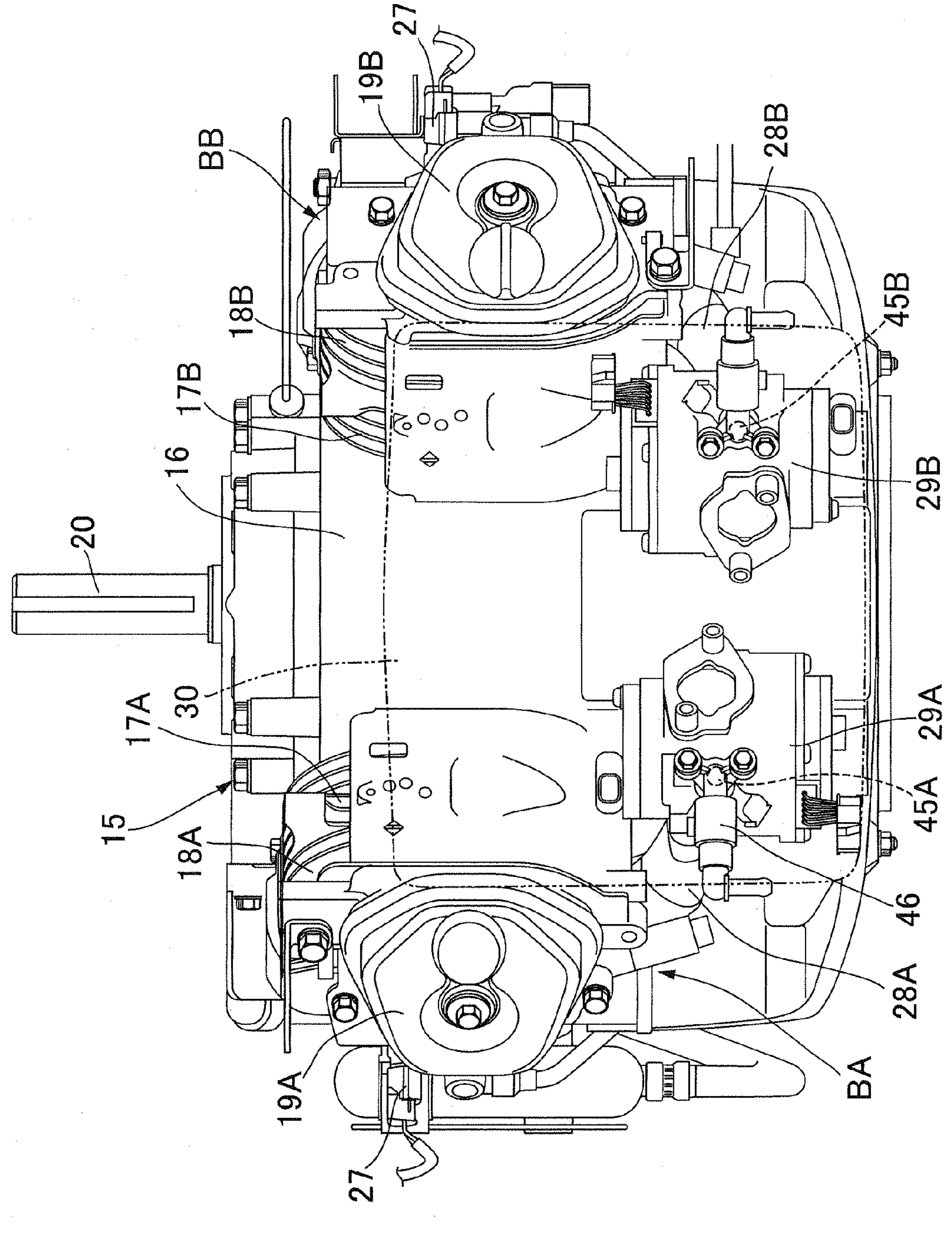
FIG. 2 is a plan view seen in the direction of arrow 2 in FIG. 1.

Referring to FIGS. 1 and 2, the general-purpose engine is an air-cooling V-twin engine used in a working machine, for example. An engine body 15 includes a crankcase 16 having first and second banks BA and BB, that together form a V-shape, disposed on the crankcase 16. The first bank BA includes a first cylinder block 17A joined to an upper part of the crankcase 16, a first cylinder head 18A joined to the first cylinder block 17A, and a first head cover 19A joined to the first cylinder head 18A. The second bank BB includes a second cylinder block 17B joined to an upper part of the crankcase 16 to form a V-shape with the first cylinder block 17A, a second cylinder head 18B joined to the second cylinder block 17B, and a second head cover 19B joined to the second cylinder head 18B.

A crankshaft 20 is rotatably supported by the crankcase 16, and one end of the crankshaft 20 protrudes from one side surface of the crankcase 16 toward outside. The other side of the engine body 15 is covered with a cover 21 attached to the crankcase 16. The cover 21 is provided with an air suction port 23 taking in air from the outside by using a cooling fan 22 fixed to the crankshaft 20 inside the cover 21. In addition, the first and second cylinder heads 18A and 18B are provided with spark plugs 24A and 24B, respectively.

A protrusion 25 is provided on the outer periphery of the cooling fan 22 in a protruding manner. A revolution number sensor 26 for detecting a revolution number of the crankshaft 20, i.e. the revolution number of the engine, by detecting the protrusion 25 is attached to an inner surface of the crankcase 16. Moreover, engine temperature sensors 27 and 27 for detecting the temperature of the engine body 15 are attached to the first and second cylinder heads 18A and 18B, respectively.

Intake ports (not shown) are provided, respectively, in side surfaces of the first and second cylinder heads 18A and 18B on the side covered with the cover 21. The downstream ends of first and second intake pipes 28A and 28B extending to the intake ports of the cylinder heads 18A and 18*b* are connected to the first and second cylinder heads 18A and 18B, respectively, while the upstream ends of the first and second intake pipes 28A and 28B are connected to the downstream ends of first and second throttle bodies 29A and 29B, respectively. The upstream ends of the first and second throttle bodies 29A and 29B are both connected to an air cleaner 30 disposed above a part of the engine body 15, located between the first and second banks BA and BB.

Figure 3:
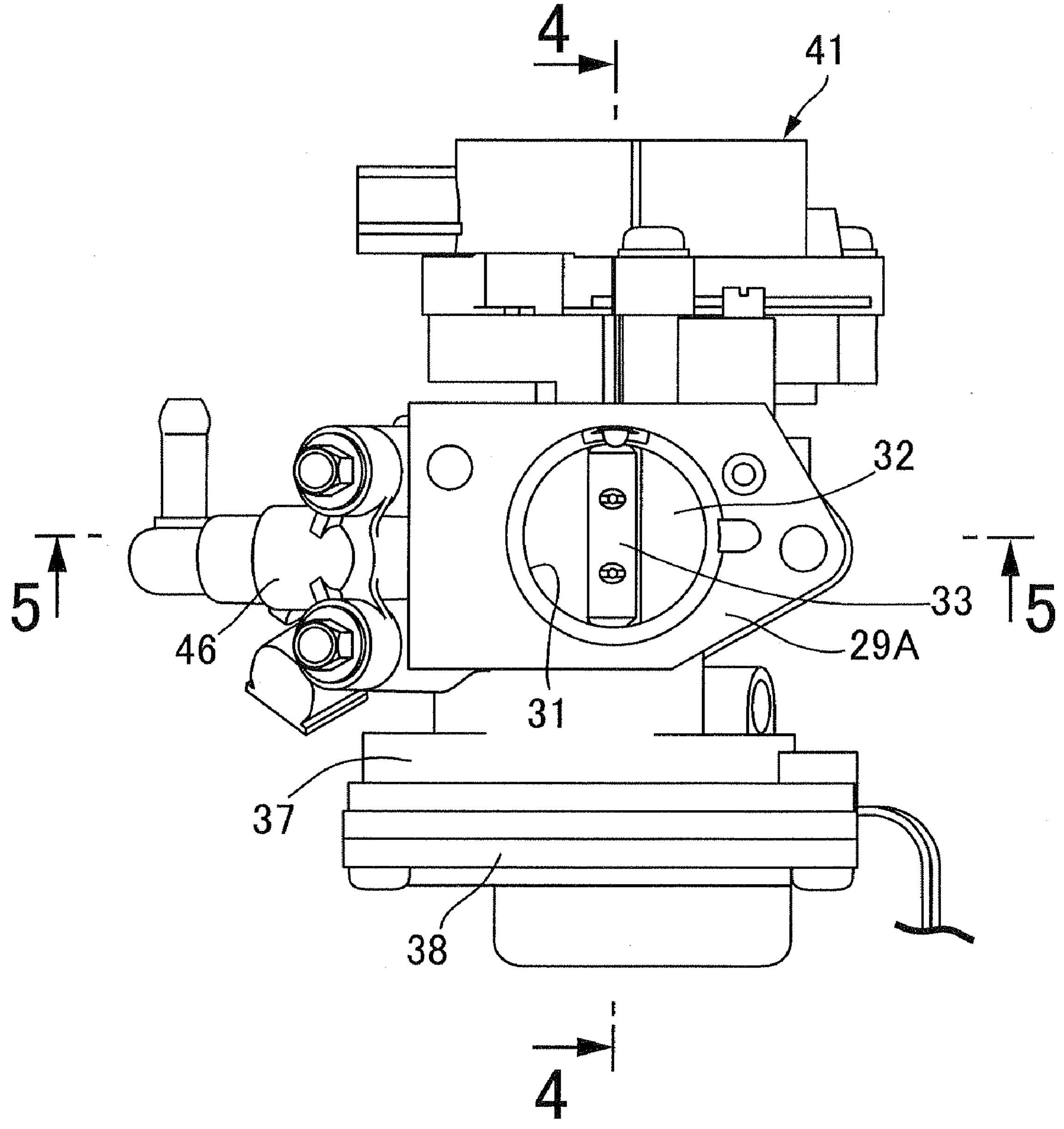
FIG. 3 is a view showing a throttle body seen in the direction of arrows 3-3 in FIG. 1.
Figure 4:
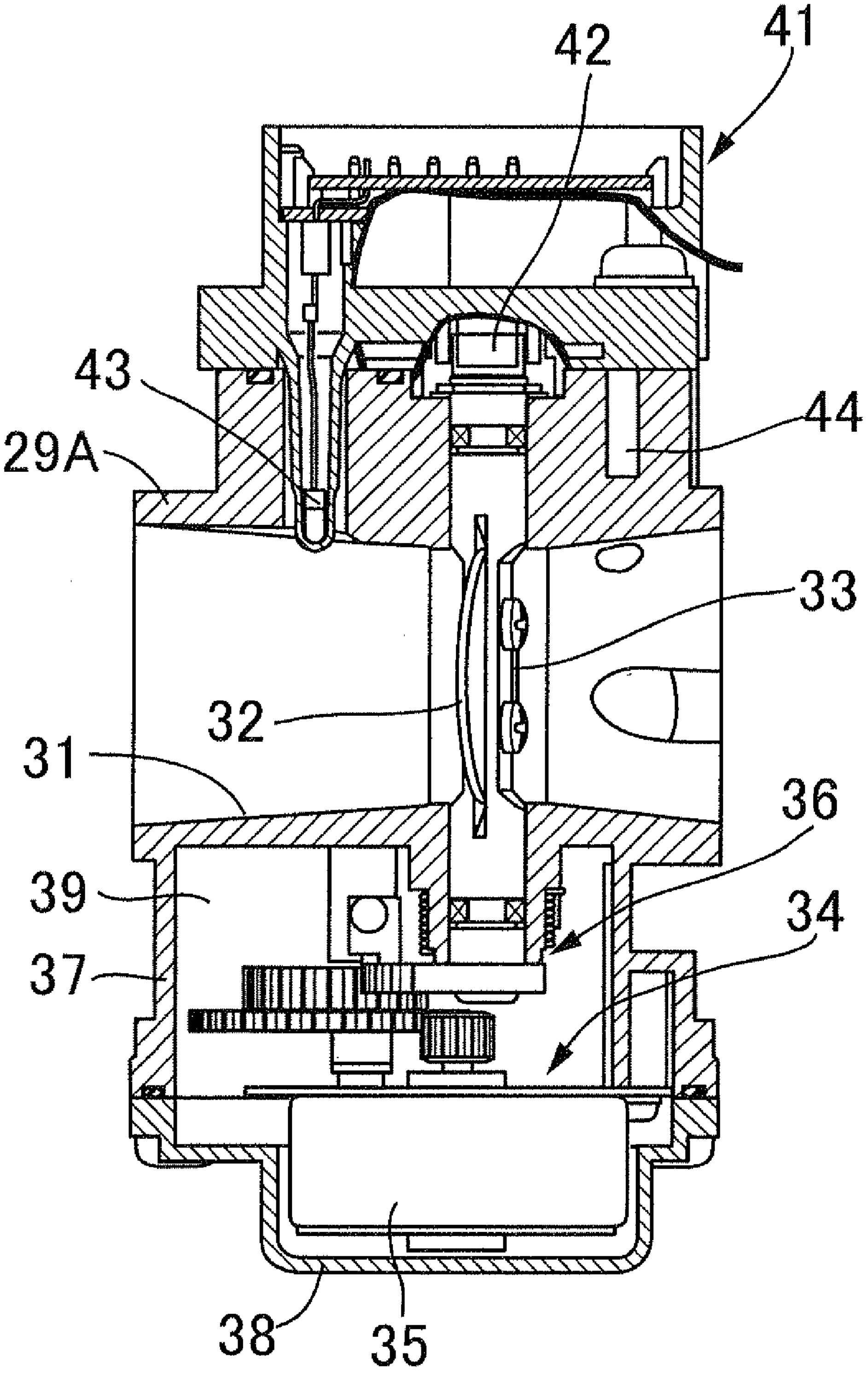
FIG. 4 is a cross-sectional view taken along line 4-4 in FIG. 3.

Referring to FIGS. 3 and 4, an intake passage 31 leading to the corresponding intake port is formed in the first throttle body 29A. A butterfly throttle valve 32 controlling the opening degree of the intake passage 31 is fixed to a valve stem 33 provided across the intake passage 31 and rotatably supported by the first throttle body 29A.

A throttle driving means 34 is connected to one end of the valve stem 33. The throttle driving means 34 includes an electric motor 35, and a reduction gear mechanism 36 reducing the rotation power of the electric motor 35 and then transmitting the resultant rotation power to the valve stem 33. A working chamber 39 is formed by a cylindrical case 37 integrally provided on the first throttle body 29A, and a closure member 38 is fastened to the case 37 to close the opening end of the case 37. The throttle driving means 34 is housed in the functioning chamber 39.

A sensor unit 41 is attached to the first throttle body 29A and faces the other end of the valve stem 33. The sensor unit 41 includes a throttle position sensor 42 connected to the other end of the valve stem 33, which detects the opening degree of the throttle valve 32, an intake-air temperature sensor 43 detecting the temperature of intake air flowing through the intake passage 31, and an intake-air pressure sensor 44 detecting the intake-air pressure.

Figure 5:
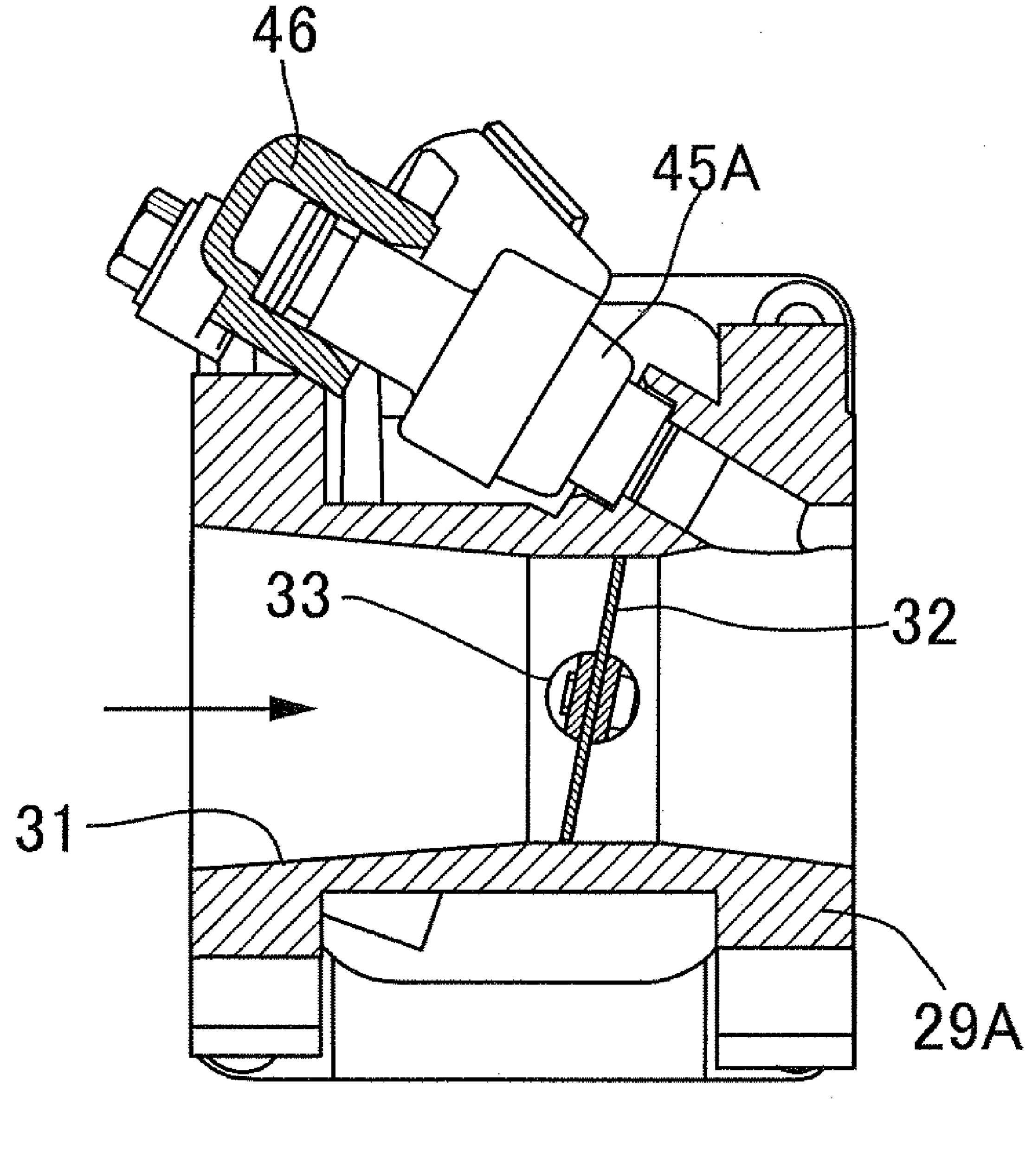
FIG. 5 is a cross-sectional view taken along line 5-5 in FIG. 3.

Referring to FIG. 5 together, a fuel injection valve 45A injecting fuel into the intake passage 31 is attached to a part of the first throttle body 29A located on the downstream side relative to the throttle valve 32. The fuel injection valve 45A is disposed between the first throttle body 29A and a cap 46 fitted to a rear portion of the fuel injection valve 45A, the valve 45A being fastened to the first throttle body 29A.

The second throttle body 29B has basically the same configuration as that of the first throttle body 29A. Thus, the second throttle body 29B, as the first throttle body 29A, includes a throttle driving means 34, a throttle position sensor 42, an intake-air temperature sensor 43, and an intake-air pressure sensor 44, wherein a fuel injection valve 45B is attached to the second throttle body 29B.

On a part of the cover 21 located between the first and second banks BA and BB, a knob 47, which serves as a throttle operating means for setting the opening degrees of the throttle valves 32 of the first and second banks BA and BB by manual operation, is disposed. The opening degree of both throttle valves 32 is set in accordance with a value detected by a potentiometer 48 (see FIG. 6), which detects the rotation position of the knob 47.

Figure 6:
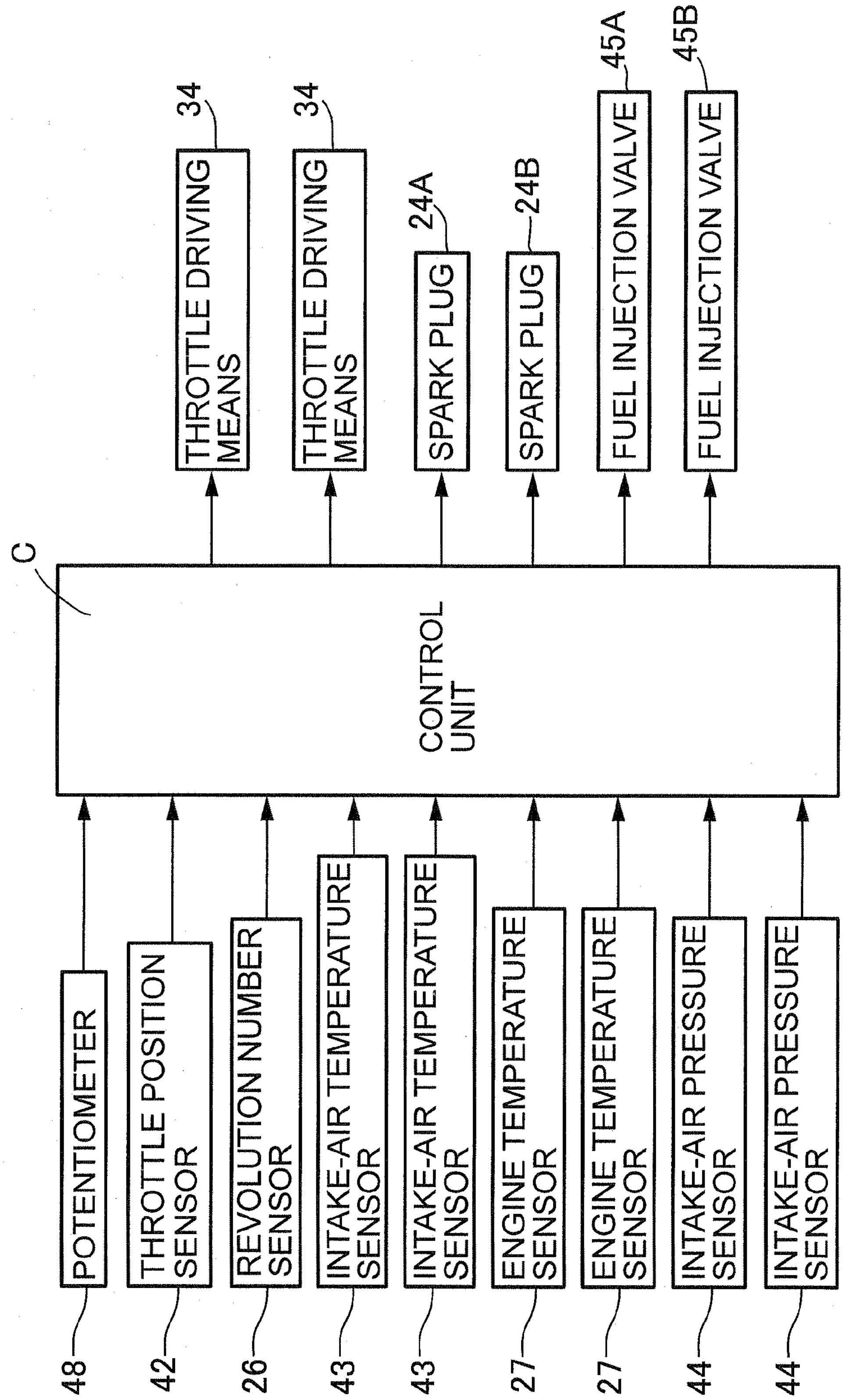
FIG. 6 is a block diagram showing a configuration of the control system according to a first embodiment of the present invention.

A support plate 49 supporting a control unit C for controlling the engine operation is attached to the second cylinder head 18B of the second bank BB out of the first and second banks BA and BB. As shown in FIG. 6, values detected by the potentiometer 48, the revolution number sensor 26, the engine temperature sensors 27, the throttle position sensors 42, the intake-air temperature sensors 43, and the intake-air pressure sensors 44 are each inputted to the control unit C. On the basis of the values input by the potentiometer 48 and sensors 26, 27, 42, 43, and 44, the control unit C controls operation of the electric motor 35 in the throttle driving means 34, ignition timing of the spark plugs 24A and 24B in the banks BA and BB, and fuel injection of the fuel injection valves 45A and 45B provided, respectively, in the first and second throttle bodies 29A and 29B.

Figure 7:
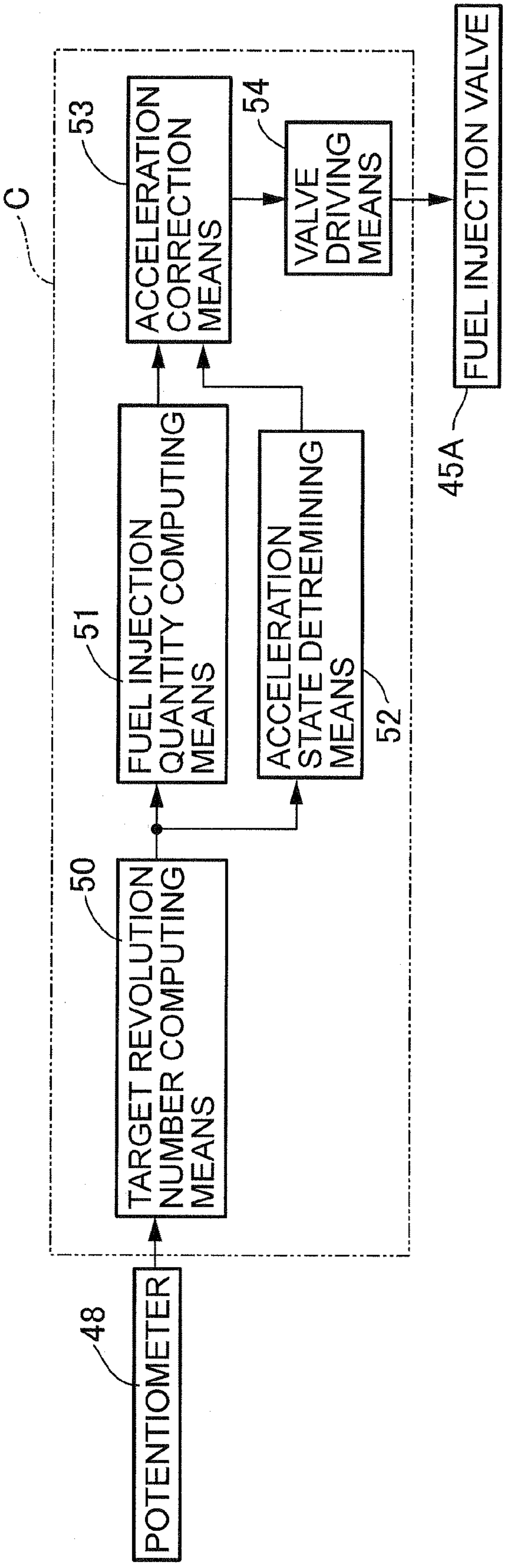
FIG. 7 is a block diagram showing a configuration of a fuel injection quantity control section of the control system's control unit.

The control unit C corrects the amount of fuel injected by the fuel injection valves 45A and 45B toward an increased side, when the engine is in an acceleration state resulting from operation of the knob 47 sensed by the potentiometer 48. As shown in FIG. 7, the section related to the fuel injection quantity control for the fuel injection valve 45A in the control unit C includes a target revolution number computing means 50, which serves as a detection means that detects an index representing the opening degrees of the throttle valves 32 on the basis of the value sensed by the potentiometer 48; fuel injection quantity computing means 51 computing a basic fuel injection quantity of the fuel injection valve 45A based on the value computed by the target revolution number computing means 50; acceleration state determining means 52 determining whether the engine is in an acceleration state based on a change in value computed by the target revolution number computing means 50; acceleration correction means 53 which performs an acceleration correction to correct the value computed by the fuel injection quantity computing means 51 when the acceleration state determining means 52 determines that the engine is in an acceleration state; and valve driving means 54 driving the fuel injection valve 45A so that the fuel injection valve 45A can inject fuel of the fuel injection quantity corrected through the acceleration correction performed by the acceleration correction means 53.

The target revolution number computing means 50 computes a target revolution number of the engine based on the opening degrees of the throttle valves 32 corresponding to operation of the knob 47 that is detected by the potentiometer 48. Basically, when there is an increase in the target revolution number, which is computed by the target revolution number computing means 50, that is a predetermined value, for example, 150 rpm, or more, within a first predetermined time period T1, for example, 100 msec, the acceleration state determining means 52 determines that the engine is in an acceleration state, and then inputs a signal for inducing a fuel-amount-increase correction to the acceleration correction means 53. However, when opening/closing operations are successively performed on the knob 47 to open and close the throttle valves 32, the acceleration state determining means 52 determines whether an acceleration determination should be performed by following the process shown in FIG. 8, which is discussed below.

Figure 8:
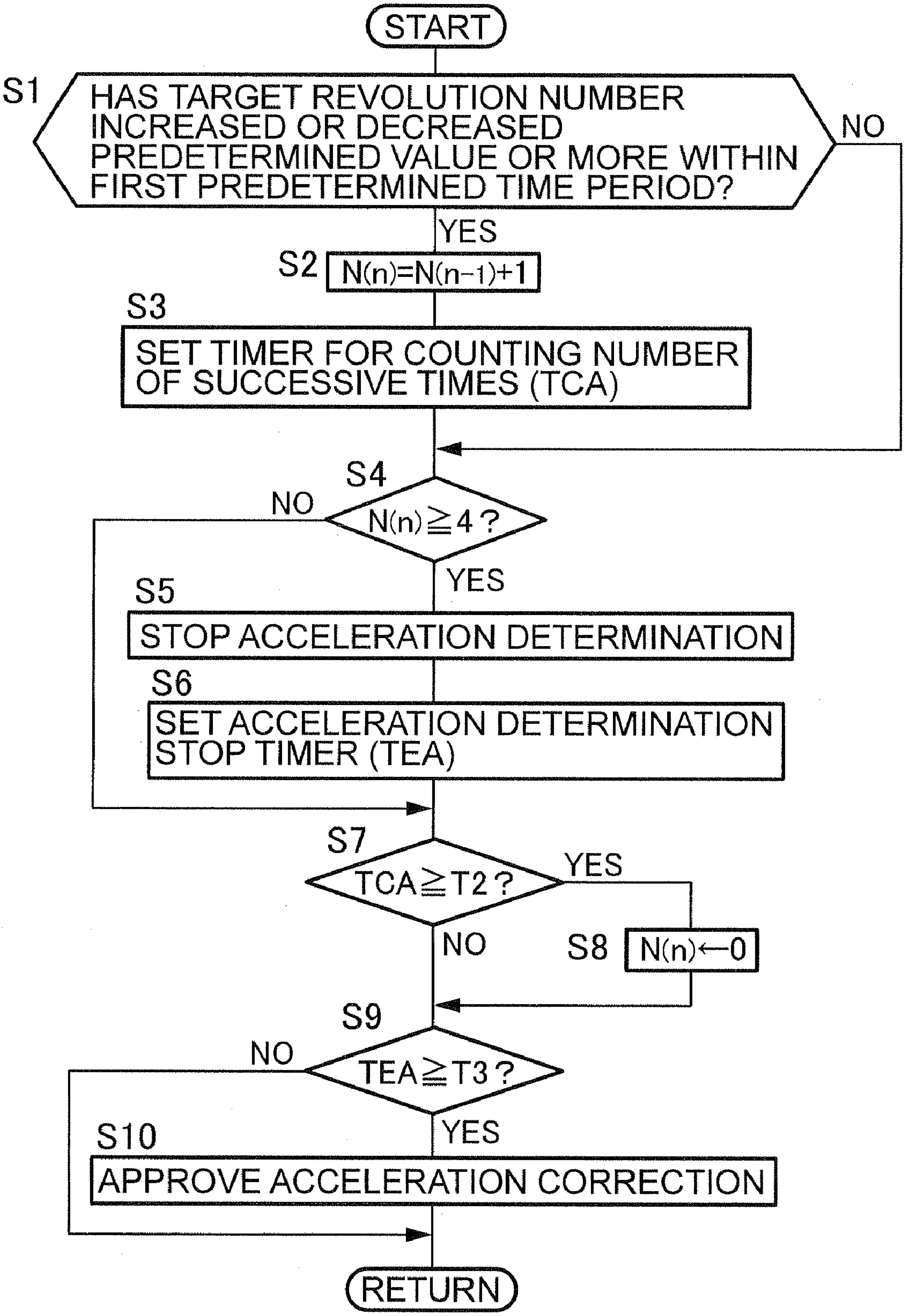
FIG. 8 is a flowchart showing a process through which an acceleration state determinor determines whether acceleration determination should be performed.

In step S1 in FIG. 8, the acceleration state determining means 52 determines whether an increase or a decrease in target revolution number computed by the target revolution number computing means 50 is a predetermined value, for example, 150 rpm, or more within the first predetermined time period T1, for example, 100 msec. When it is determined that such a change has occurred, the number of times N(n) is set in accordance with an expression, N(n)=N(n−1)+1, in step S2. Here, N(n) represents the number of times of current time, while N(n−1) represents the number of times of the last time, and the first N(n−1) is "0." After a timer for counting the number of successive times is set in step S3, the process proceeds to step S4.

When the acceleration state determining means 52 determines that the increase or the decrease in target revolution number was not a predetermined value, for example, 150 rpm, or more within the first predetermined time period T1, for example, 100 msec, in step S1, the process skips steps S2 and S3, and proceeds to step S4. In step S4, the acceleration state determining means 52 determines whether the number of times N(n) is a predetermined number, for example, 4, or more. When it is determined that N(n)≧4, the process proceeds to step S5 to stop the acceleration determination. After an acceleration determination stop timer is set in step S6, the process proceeds to step S7.

When it is determined that N(n)<4 in step S4, the process skips steps S5 and S6, and proceeds to step S7. In step S7, the acceleration state determining means 52 determines whether a measured time TCA measured by the timer for counting the number of successive times has exceeded a second predetermined time period T2, for example, 2500 msec. When it is determined that the measured time TCA has exceeded the second predetermined time period T2, the process proceeds to step S8 to clear the number of times N(n), and then proceeds to step S9. When it is determined that the measured time TCA has not exceeded the second predetermined time period T2, the process skips step S8, and proceeds to step S9.

In step S9, the acceleration state determining means 52 determines whether a measured time TEA measured by the acceleration determination stop timer has exceeded a third predetermined time period T3, for example, 6000 msec. When it is determined that the measured time TEA has exceeded the third predetermined time period T3, acceleration correction is approved in step S10.

According to the above-described procedure, when the number of successive times N of the state where an amount of change in the value computed by the target revolution number computing means 50 continuously reaches a predetermined value or more in either of increasing or decreasing direction within a first predetermined time period T1, for example, 100 msec, a predetermined number of times, for example, 4, or more before a second predetermined time period T2, for example, 2500 msec, expires on each state, the acceleration state determining means 52 stops the determination of the acceleration state until a third predetermined time period T3, for example, 6000 msec, passes.

Figure 9:
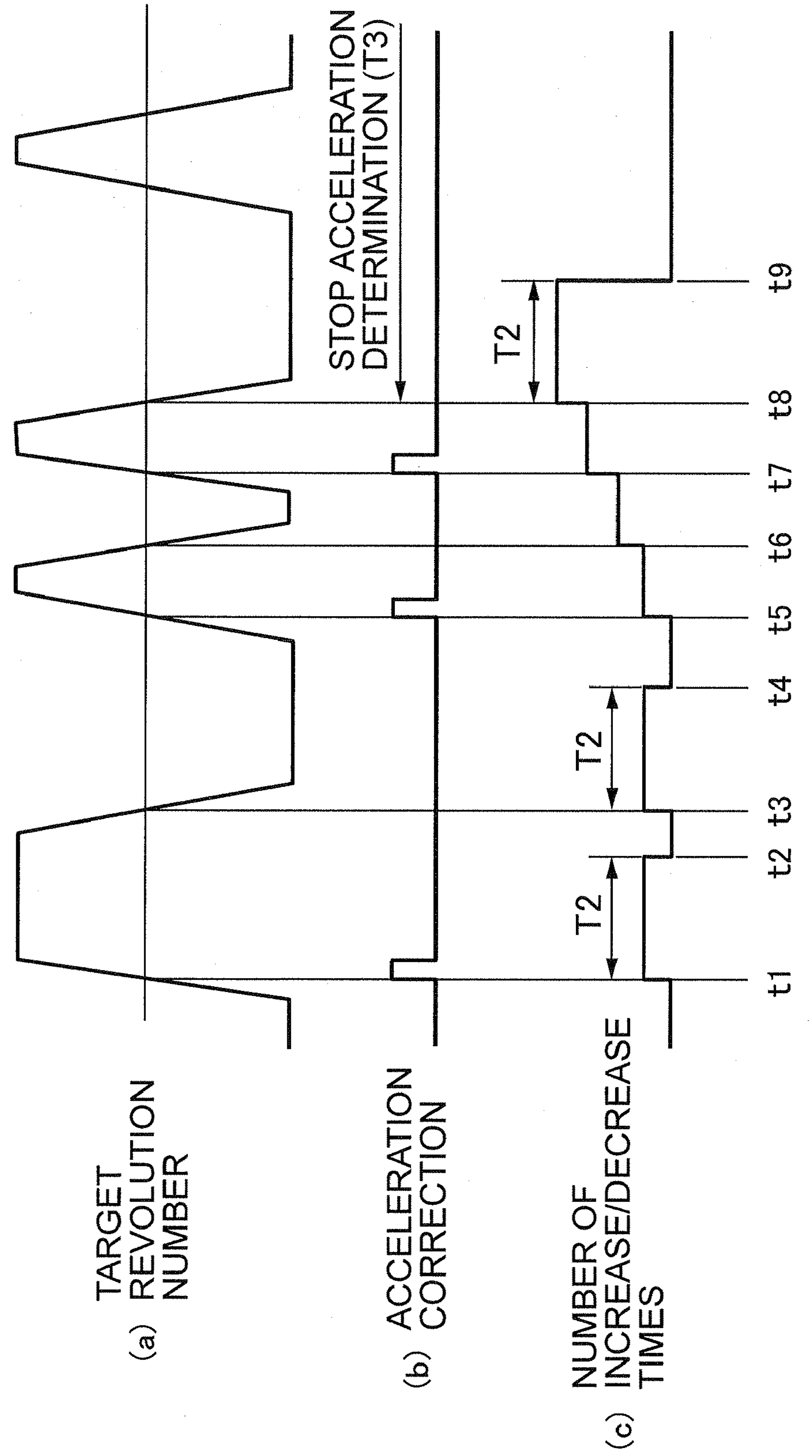
FIG. 9 is a timing chart showing an example of a determination made by the acceleration state determiner.

An example of a determination by the acceleration state determining means 52 at the time when the target revolution number repeatedly increases and decreases in accordance with successive opening/closing operations of the knob 47 serving as throttle operating means will be described here with reference to FIG. 9. When an increase in the target revolution number is a predetermined value or more within the first predetermined time period T1, at time point t1, the acceleration state determining means 52 determines that the engine is in an acceleration state. Upon such a determination, an acceleration correction is performed to correct the fuel injection quantity, and the number of increase/decrease times is incremented to 1 at time point t1. However, at time point t2, when the second predetermined time period T2 has elapsed time point t1, the number of increase/decrease times is cleared. Then, at time point t3 when a decrease in the target revolution number is the predetermined value or more within the first predetermined time period T1, the number of increase/decrease times is incremented to 1. However, at time point t4 when the second predetermined time period T2 has elapsed time point t3, the number of increase/decrease times is cleared.

Thereafter, at time point t5, an increase in the target revolution number is the predetermined value or more within the first predetermined time period T1. At time point t6, after a time period shorter than the second predetermined time period T2 has elapsed time point t5, a decrease in the target revolution number is the predetermined value or more within the first predetermined time period T1. At time point t7, after a time period shorter than the second predetermined time period T2 has elapsed time point t6, an increase in the target revolution number is the predetermined value or more within the first predetermined time period T1. At time point t8, after a time period shorter than the second predetermined time period T2 has elapsed time point t7, a decrease in the target revolution number is the predetermined value or more within the first predetermined time period T1. In this case, the number of increase/decrease times increments by 1 at each of time points t5, t6, t7 and t8. Although the acceleration correction of the fuel injection quantity is performed at each of times t5 and t7, after time point t8 when the number of increase/decrease times reaches 4, acceleration determination is stopped until the third predetermined time period T3 elapses time point t8.

Then, at time point t9 when the second predetermined time period T2 has elapsed time point t8, the number of increase/decrease times is cleared.

Next, the operation of the first embodiment will be described. When the state where an amount of change in the value computed by the target revolution number computing means 50 that computes a target revolution number, which is an index representing the opening degrees of the throttle valves 32, continuously reaches a predetermined value or more in either of increasing or decreasing direction within a first predetermined time period T1 a predetermined number of times or more before a second predetermined time period T2 expires on each state, the acceleration state determining means 52 stops determination of the acceleration state until a third predetermined time period T3 passes. Accordingly, it is possible to prevent the unnecessary performance of correcting the amount of fuel injected by the fuel injection valves 45A and 45B toward an increased side when the throttle valves 32 successively open and close in accordance with successive opening/closing operations of the knob 47, thereby preventing an after-burn from occurring.

Figure 10:
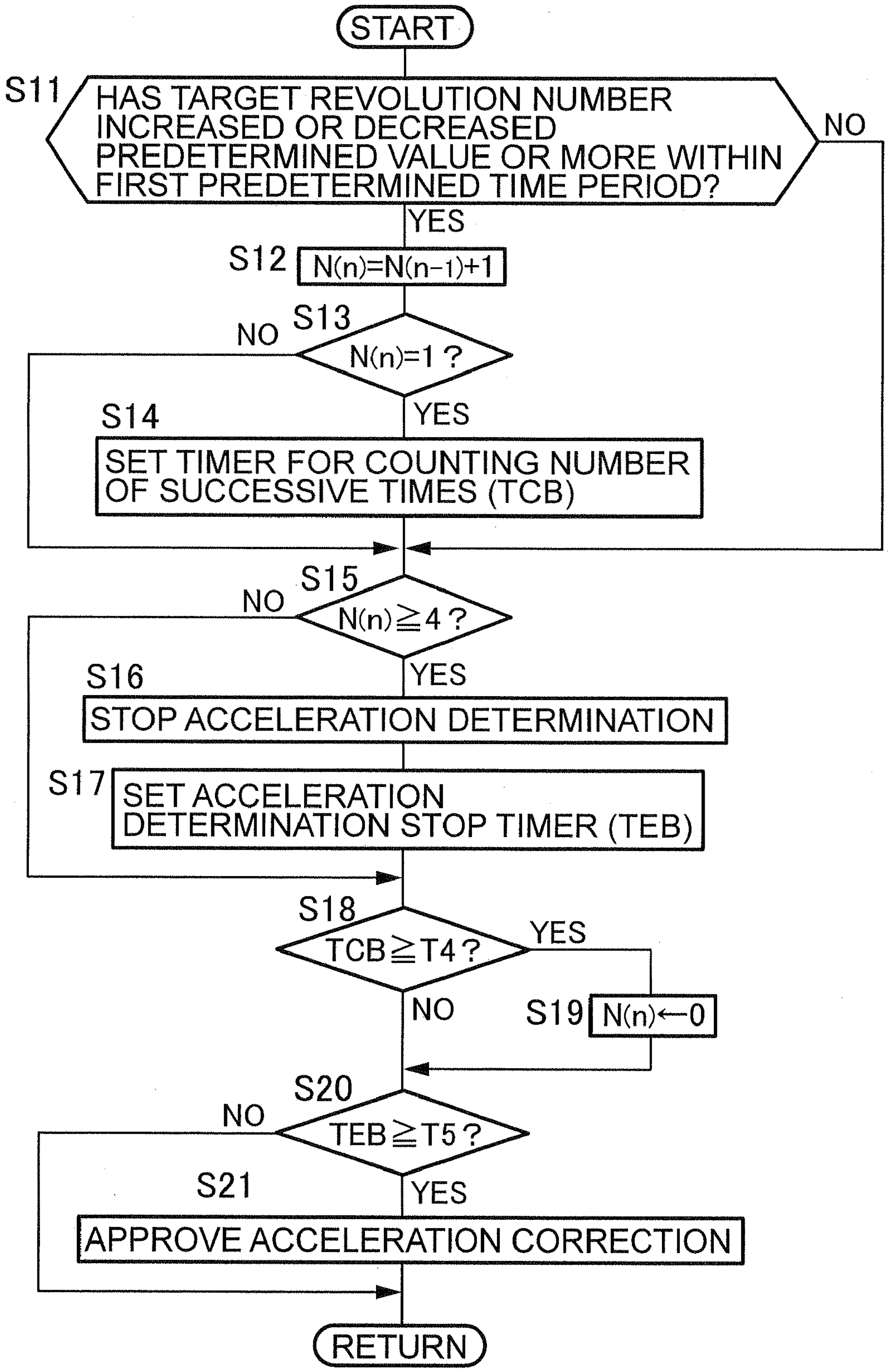
FIG. 10 is a flowchart showing a procedure through which the acceleration state determinor determines whether an acceleration determination should be performed according to a second embodiment of the present invention.
Figure 11:
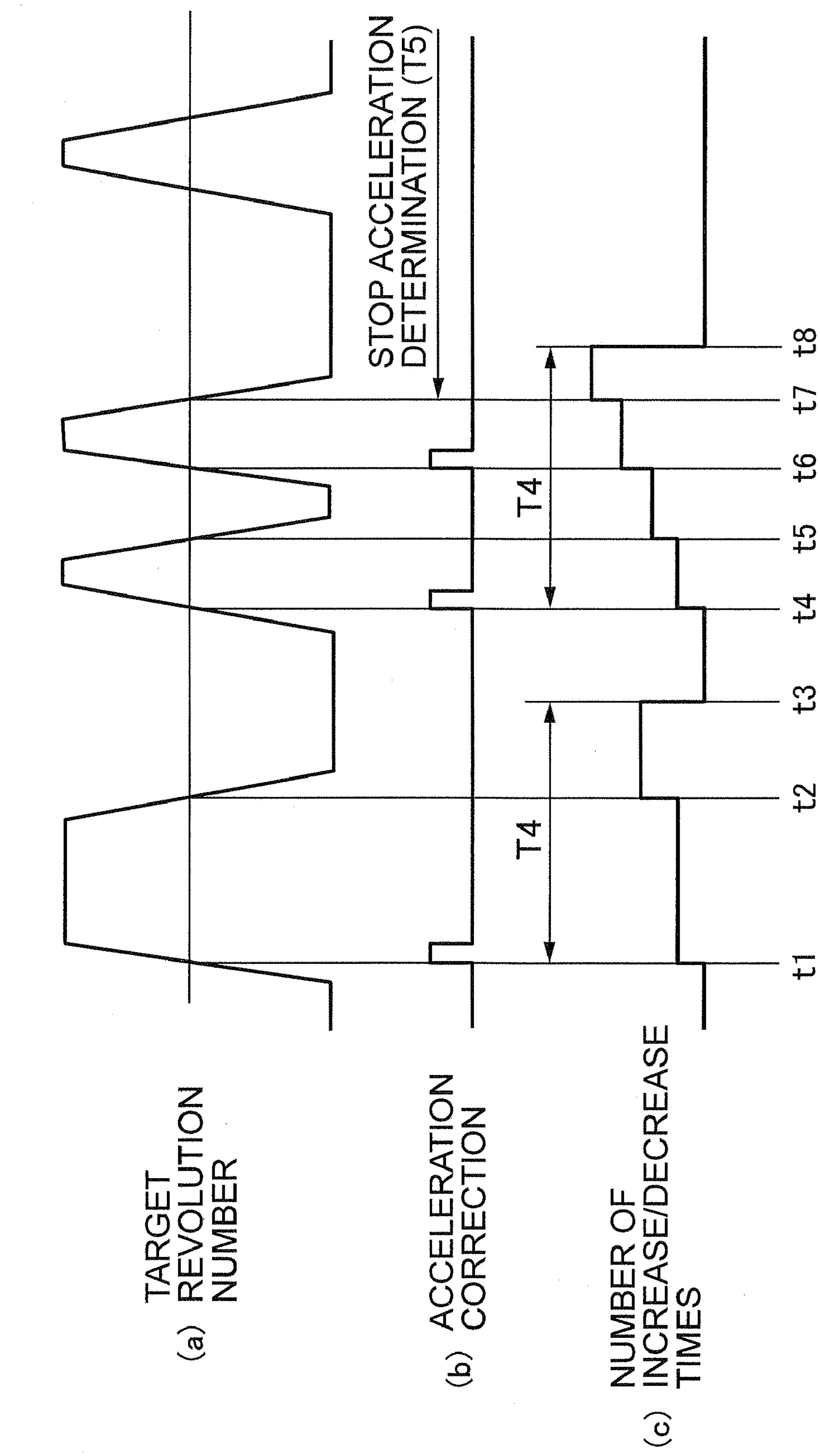
FIG. 11 is a timing chart showing an example of the acceleration determination performed in FIG. 10.

FIGS. 10 and 11 show a second embodiment of the present invention.

The acceleration state determining means 52 (see the first embodiment) determines whether an acceleration determination should be performed, by following the procedure shown in FIG. 10. In step S11 of FIG. 10, the acceleration state determining means 52 determines whether an increase or a decrease in the target revolution number has reached a predetermined value, for example, 150 rpm, or more within the first predetermined time period T1, for example, 100 msec. When it is determined that such a change has occurred, the number of times N(n) is set in accordance with the expression, N(n)=N(n−1)+1, in step S12. In step S13, the acceleration state determining means 52 determines whether the number of times N(n) is "1." When it is determined that N(n)=1, a timer for counting the number of successive times is set in step S14, and the process proceeds to step S15. On the other hand, when it is determined that N(n)≠"1" in step S13, the process skips step S14, and proceeds to step S15. When it is determined that an increase or a decrease in target revolution number has not reached the predetermined value, for example, 150 rpm, or more, within the first predetermined time period T1, for example, 100 msec, the process skips steps S12, S13, and S14, and proceeds to step S15.

In step S15, the acceleration state determining means 52 determines whether the number of times N(n) is a predetermined number, for example, 4, or more. When it is determined that N(n)≧4, the process proceeds to step S16 to stop acceleration determination. After an acceleration determination stop timer is set in the next step S17, the process proceeds to step S18. By contrast, when it is determined that N(n)<4, in step S15, the process skips steps S16 and S17, and proceeds to step S18.

In step S18, the acceleration state determining means 52 determines whether a measured time TCB measured by the timer for counting the number of successive times has exceeded a fourth predetermined time period T4, for example, 2500 msec. When it is determined that the measured time TCB has exceeded the fourth predetermined time period T4, the process proceeds to step S19 to clear the number of times N(n), and then proceeds to step S20. On the other hand, when it is determined that the measured time TCB has not exceeded the fourth predetermined time period T4, the process skips step S19, and proceeds to step S20.

In step S20, the acceleration state determining means 52 determines whether a measured time TEB measured by the acceleration determination stop timer has exceeded a fifth predetermined time period T5, for example, 6000 msec. When it is determined that the measured time TEB has exceeded the fifth predetermined time period T5, acceleration correction is approved in step S21.

According to the above-described procedure, when the number N of the state where an amount of change in the value computed by the target revolution number computing means 50 reaches a predetermined value, for example, 150 rpm, or more in either of increasing or decreasing direction within a first predetermined time period T1, for example, 100 msec, reaches a predetermined number of times, for example, 4, or more within a fourth predetermined time period T4, for example, 2500 msec, the acceleration state determining means 52 stops determination of the acceleration state until a fifth predetermined time period T5, for example, 6000 msec, passes.

An example of such a determination by the acceleration state determining means 52 in the second embodiment will be described with reference to FIG. 11. When an increase in the target revolution number is a predetermined value or more within the first predetermined time period T1 at time point t1, the acceleration state determining means 52 determines that the engine is in an acceleration state. Upon such a decision, acceleration correction on the fuel injection quantity is performed, and the number of increase/decrease times is incremented to 1 at time point t1. When a decrease in target revolution number is the predetermined value within the first predetermined time period T1 at time point t2 before the fourth predetermined time period T4 elapses since time point t1, the number of increase/decrease times is incremented to 2. However, at time point t3, when the fourth predetermined time period T4 has elapsed time point t1, the number of increase/decrease times is cleared.

Then, at time point t4, an increase in the target revolution number is the predetermined value or more within the first predetermined time period T1. At time point t5, a decrease in the target revolution number is the predetermined value or more within the first predetermined time period T1. At time point t6, an increase in the target revolution number is the predetermined value or more within the first predetermined time period T1. At time point t7, a decrease in the target revolution number is the predetermined value or more within the first predetermined time period T1. When the time period from time point t4 to time point t7 is less than the fourth predetermined time period T4, the number of increase/decrease times is incremented by 1 at each of times t4, t5, t6, and t7. Although the acceleration correction of the fuel injection quantity is performed at each of times t4 and t6, after time point t7 when the number of increase/decrease times reached 4, acceleration determination is stopped until the fifth predetermined time period T5 elapses time point t7. Then, at time point t8 when the fourth predetermined time period T4 has elapsed time point t4, the number of increase/decrease times is cleared.

According to the second embodiment, when the state where an amount of change in the value computed by the target revolution number computing means 50 reaches a predetermined value or more in either of increasing or decreasing direction within a first predetermined time period T1 occurs a predetermined number of times (four times in the second embodiment) or more within a fourth predetermined time period T4, the determination of the acceleration state is stopped until a fifth predetermined time period T5 passes. Accordingly, it is possible to prevent the unnecessary performance of correcting the amount of fuel injected by the fuel injection valves 45A and 45B toward an increased side when the throttle valves 32 successively open and close in accordance with successive opening/closing operations of the knob 47, thereby preventing an after-burn from occurring.

Hereinabove, the embodiments of the present invention have been described. However, the present invention is not limited to the above-described embodiments, and various design changes can be made without departing from the present invention within the scope of claims.

What is claimed is:

1. A fuel injection quantity control system for a general-purpose engine having a control unit controlling an amount of fuel injected by a fuel injection valve into an intake passage, in accordance with an operation of throttle operating means that sets an opening degree of a throttle valve by manual operation, the control unit correcting the amount of fuel injected by the fuel injection valve toward an increased side when an acceleration state resulting from operation of the throttle operating means occurs, the control unit comprising:

detection means for detecting an index representing the opening degree of the throttle valve;

acceleration state determining means for making a determination on the acceleration state based on a change in a value detected by the detection means; and acceleration correction means for correcting the amount of fuel injected by the fuel injection valve toward the increased side, when the acceleration state determining means determines that the acceleration state is present, wherein when an increase in the value detected by the detection means is a predetermined value or more within a first predetermined time period, the acceleration state determining means determines that the acceleration state is present, and then inputs a signal inducing fuel-amount-increase correction to the acceleration correction means, and when the state where an amount of change in the value detected by the detection means reaches a predetermined value or more in either of increasing or decreasing direction within a first predetermined time period continuously occurs a predetermined number of times or more before a second predetermined time period expires on each state, the determination of the acceleration state is stopped until a third predetermined time period passes.

2. The control system according to claim 1, wherein the detection means computes a target revolution number of the engine.

3. The control system according to the claim 2, wherein the throttle operating means comprises a knob.

4. The control system according to claim 3, wherein the target revolution number of the engine computed by the detection means is based on the opening degree of the throttle valve corresponds to an operation of the knob.

5. The control system according to the claim 4, wherein operation of the knob is detected by a potentiometer.

6. A fuel injection quantity control system for a general-purpose engine having a control unit controlling an amount of fuel injected by a fuel injection valve into an intake passage, in accordance with an operation of throttle operating means that sets an opening degree of a throttle valve by manual operation, the control unit correcting the amount of fuel injected by the fuel injection valve toward an increased side when an acceleration state resulting from operation of the throttle operating means occurs, the control unit comprising:

detection means for detecting an index representing the opening degree of the throttle valve;

acceleration state determining means for making a determination on the acceleration state based on a change in a value detected by the detection means; and acceleration correction means for correcting the amount of fuel injected by the fuel injection valve toward the increased side, when the acceleration state determining means determines that the acceleration state is present, wherein when an increase in the value detected by the detection means is a predetermined value or more within a first predetermined time period, the acceleration state determining means determines that the acceleration state is present, and then inputs a signal inducing fuel-amount-increase correction to the acceleration correction means, and when the state where an amount of change in the value detected by the detection means reaches a predetermined value or more in either of increasing or decreasing direction within a first predetermined time period occurs a predetermined number of times or more within a fourth predetermined time period, the determination of the acceleration state is stopped until a fifth predetermined time period passes.

7. The control system according to claim 6, wherein the detection means computes a target revolution number of the engine.

8. The control system according to the claim 7, wherein the throttle operating means comprises a knob.

9. The control system according to claim 8, wherein the target revolution number of the engine computed by the detection means is based on the opening degree of the throttle valve corresponds to an operation of the knob.

10. The control system according to the claim 9, wherein operation of the knob is detected by a potentiometer.

* * * * *